July 7, 1959 W. R. MAGRUDER ET AL 2,894,139
APPARATUS FOR TREATING POLYETHYLENE CONTAINERS FOR PRINTING
Filed July 10, 1956 3 Sheets-Sheet 1

INVENTORS,
William R. Magruder
Charles W. Gomeringer
BY
Thos. E. Scofield
ATTORNEY.

July 7, 1959 W. R. MAGRUDER ET AL 2,894,139
APPARATUS FOR TREATING POLYETHYLENE CONTAINERS FOR PRINTING
Filed July 10, 1956 3 Sheets-Sheet 2
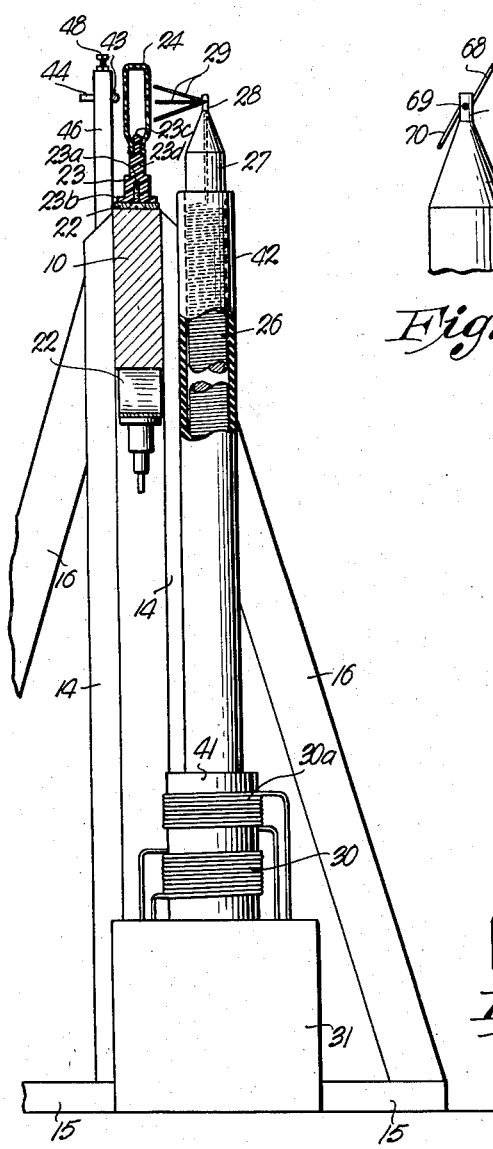
INVENTORS.
William R. Magruder
Charles W. Gomerdinger
BY
Thos. E. Scofield
ATTORNEY.

July 7, 1959 W. R. MAGRUDER ET AL 2,894,139
APPARATUS FOR TREATING POLYETHYLENE CONTAINERS FOR PRINTING
Filed July 10, 1956 3 Sheets-Sheet 3

INVENTORS.
William R. Magruder
Charles W. Gomerdinger
BY
ATTORNEY.

United States Patent Office 2,894,139
Patented July 7, 1959

2,894,139

APPARATUS FOR TREATING POLYETHYLENE CONTAINERS FOR PRINTING

William R. Magruder and Charles W. Gomerdinger, Kansas City, Mo., assignors to Injection Molding Company, Kansas City, Mo., a corporation of Missouri Application July 10, 1956, Serial No. 596,971

9 Claims. (Cl. 250—49.5)

This invention relates to the preparation of plastic bottles for printing and refers more particularly to apparatus for treating polyethylene containers with electrical corona discharge to prepare them for silk screen printing of portions of their surfaces.

A solid polymer consisting of polymerized ethylene is disclosed by U.S. Patent 2,153,553. This material is widely known as polyethylene. Some properties of polyethylene include chemical inertness to inorganic acids and alkalies either cold or at a temperature range of 80° centigrade to 90° centigrade and insolubility in many well known solvents, such as water, ethanol, amyl, alcohol, ethyl ether, acetone, chloroform and glycerine. Polyethylene is also incompatible with drying oils and with nitrocellulose. Polyethylene is a white horn-like, thermoplastic resinous material, the polymerization product of ethylene subjected to conditions of extremely high temperatures and high pressures. It is a tough, inherently flexible material resembling paraffin wax in appearance. Polyethylene resins are characterized by rather abrupt softening point, the resins generally changing from a solid to a rather soft plastic condition within a comparatively limited temperature range. The softening point of the polyethylene resins, and the degree to which softening of the resins occurs, varies, depending generally upon the average molecular weight of the said resins. Polyethylene resins are available commercially having average molecular weights from approximately 8,000 to approximately 19,000, and having softening points within the range of from approximately 140° F. to approximately 230° F.

Because of paraffin-like surface properties and its other properties, polyethylene containers cannot be satisfactorily printed with inks of the oil or lacquer types commonly employed in printing plastic containers. When polyethylene containers are printed with such inks, the dried ink impressions do not adhere firmly to the polyethylene surface and slight abrasion or application of scotch tape to the surface will remove the dried ink impressions with very little difficulty. Flexing of the container will also cause the ink to crack and fall off in many instances.

In view of the above described surface properties and inertness of polyethylene, a number of methods have been developed to treat the surface of this material to prepare it for printing. These methods include heating in various forms, treatment with various chemical reagents in liquid and gaseous form, and several types of electrical treatment. Previously, however, means have not been provided for mass production preparation of individual container surfaces with electrical means.

Therefore, an object of this invention is to provide an apparatus for the mass production high-speed treatment of polyethylene containers having surfaces to be printed with electrical corona discharge or display whereby satisfactory ink adherence to said surfaces will be achieved.

Another object of the invention is to provide apparatus for the high-speed mass production treatment of polyethylene containers having surfaces to be printed, said apparatus utilizing devices for the production of electrical corona discharge or display wherein full treatment of the containers to be printed is achieved in a single pass before the corona discharge producing machines.

Another object of the invention is to provide corona discharge producing devices for the electrical corona discharge treatment of polyethylene containers having surfaces to be printed wherein essentially uniform discharge of corona display is achieved from a plurality of discharge elements positioned on a single high voltage corona discharge producing device.

Another object of the invention is to provide apparatus for moving polyethylene containers past a corona discharge producing device whereby essentially all of the corona discharge is applied to the surface of the container to be printed without deflection of or interference with said discharge, said discharge being produced from one or more corona discharge elements positioned on a high frequency, high voltage electrical device.

Another object of the invention is to provide apparatus for the high speed mass production treatment of polyethylene containers having surfaces to be printed wherein uniform corona discharge treatment of the surfaces to be printed is achieved and means for fixing the surfaces of the containers to be printed relative the corona discharge devices as they pass thereby at relatively high velocity are provided whereby to achieve uniform coverage and treatment of the surfaces to be printed with the corona discharge.

Other and further objects of the invention will appear in the course of the following description thereof:

In the drawings, which form a part of the instant specification and are to be read in conjunction therewith, there are shown embodiments of the invention, and, in the various views, like numerals are employed to indicate like parts.

Fig. 3 is a view taken along the lines 3—3 of Fig. 1 in the direction of the arrows.

Fig. 4 is a side view of a three prong modification of the corona discharge elements to be used on a conveyor line such as is shown in Fig. 1.

Fig. 5 is a front view of the top of the corona discharge treatment device shown in Fig. 4.

Fig. 6 is a top view of the construction shown in Figs. 4 and 5.

Fig. 7 is a side view of a two prong modification of the corona discharge elements employed in a corona discharge device and as used in the conveyor line of Fig. 1.

Fig. 8 is a front view of the construction shown in Fig. 7.

Fig. 9 is a top view of the construction shown in Figs. 7 and 8.

Parts of the construction have been broken away to better illustrate the structure.

Figure 1:
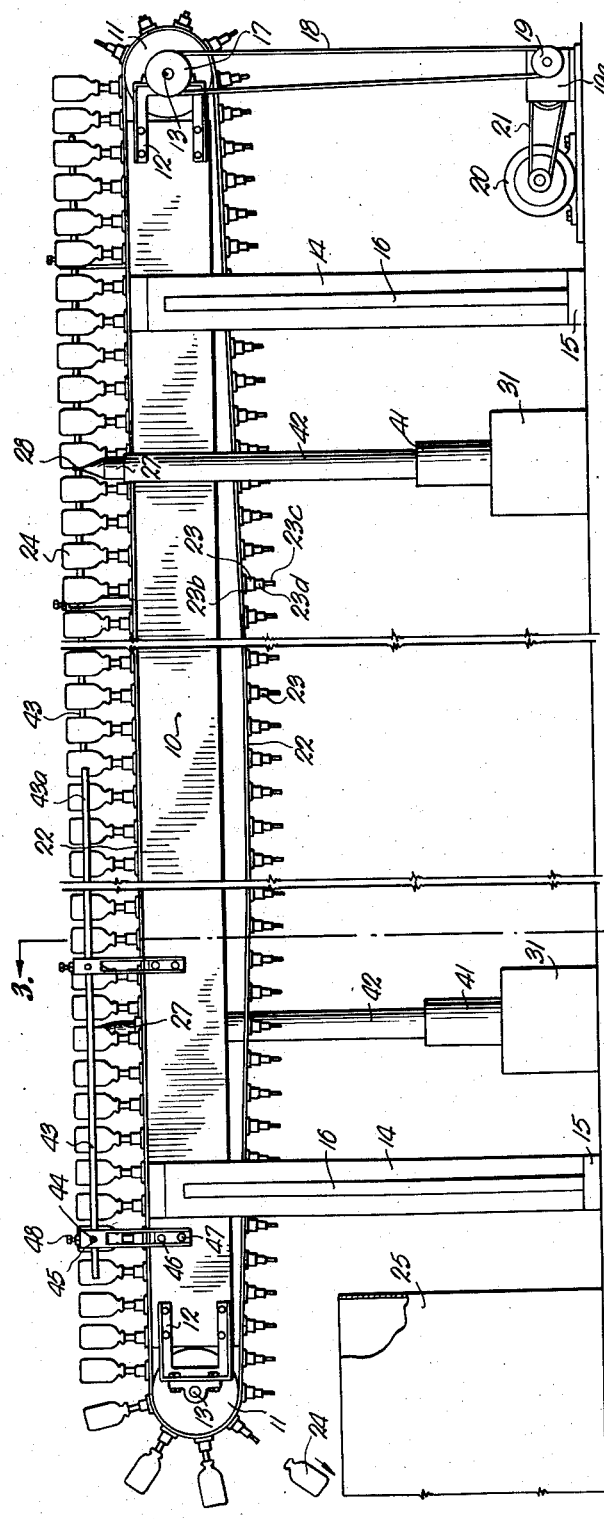
Fig. 1 is a side view of the apparatus for performing the corona discharge treatment which constitutes the present invention.
Figure 2:
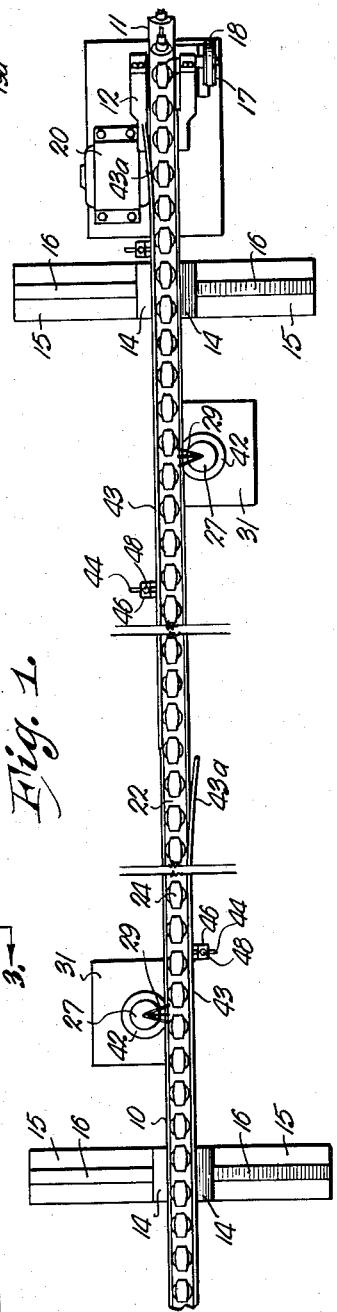
Fig. 2 is a top view of the processing line shown in Fig. 1.
Figure 12:
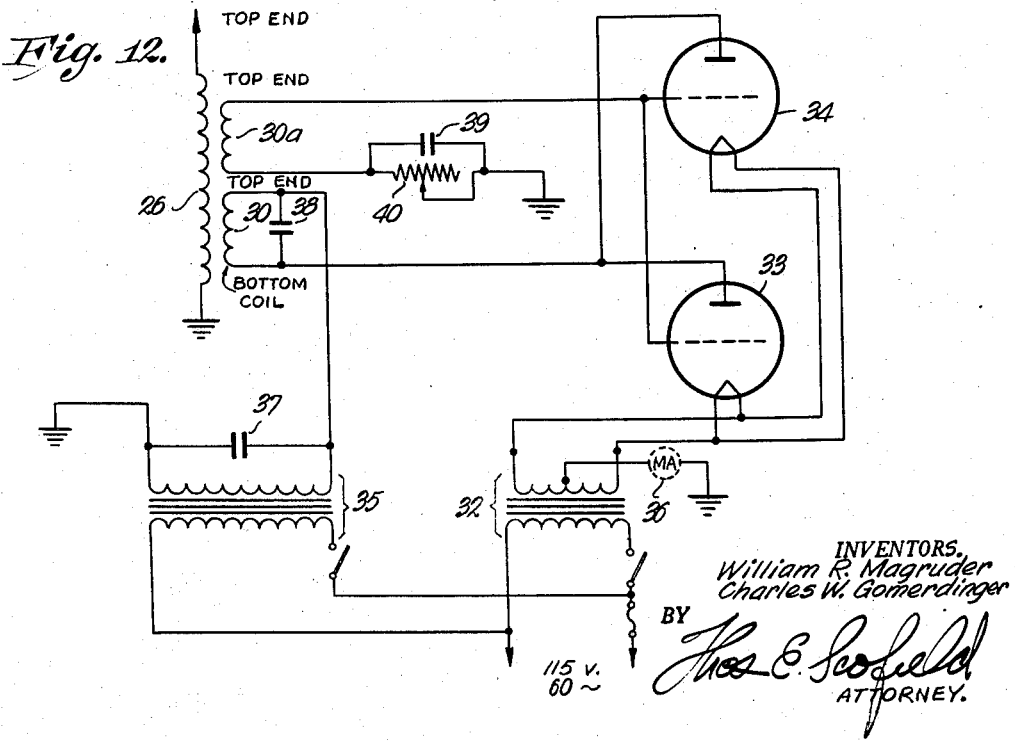

Fig. 12 is a schematic diagram of a suitable electrical circuit employable in a suitable corona discharge producing device employed with the conveyor line of Figs. 1, 2 and 3.

Referring to the drawings and more particularly to Figs. 1, 2 and 3, in these views are shown the specific embodiment of the apparatus comprising the invention. Horizontal frame member 10 is preferably constructed of wood or other dielectric material. Sheaves or pulleys 11 are rotatably mounted on the opposite ends of frame member 10 by conventional U-arm axle mountings 12 supporting axles 13. The mountings 12 are preferably of dielectric material but may be metal, provided the length of the horizontal frame member 10 is great enough to position the mountings 12 a sufficient distance from the corona discharge devices (to be described) to avoid electrical interference therewith. Vertical frame members 14 are supported by base 15, both being engaged by angled side members 16. Smaller pulley 17 is fixed to one of the axles 13. Belt 18 engages pulley 17 with gear reduction pulley 19. Power source 20, such as a conventional electric motor, drives belt 21 to actuate the pulley 19 through gear reducer 19a.

Continuous conveyor belt 22 is carried by the sheaves 11 and forms a continuous conveyor means relative frame 10. A plurality of container mountings 23 are fixed to the surface of the conveyor belt 22 by screws 23a (Fig. 3) and move therewith. The construction of the conveyor container mountings will be described later in detail. A plurality of plastic or polyethylene containers 24 are shown mounted on the conveyor belt container mountings 23 from which they fall by gravity into container receiving box or receptacle 25 after moving the length of the horizontal frame member 10. The containers 24 are mounted individually by hand on the container mountings 23 by an operator (not shown) positioned at the end of the conveyor means adjacent the power source 20.

A pair of devices for producing a directional corona discharge are shown positioned on opposite sides of the conveyor means. The corona discharge devices comprise Tesla-type coils which employ vacuum tubes as high frequency oscillators and resonant coils tuned to about 500,000 cycles per second. As seen in Figs. 1, 2 and 3, the corona discharge devices (Fig. 3) comprise tall secondary coils 26 enclosed by insulating plastic cylinders and having insulators 27 at the top thereof with electrode or discharge element carrying caps 28 extending through the tops of the insulators. Electrical display or discharge elements 29 extend from the caps 28 in the direction of the conveyor. Primary coils 30 and 30a are wound relative the bases of the secondary coils 26 and the circuit components of the corona discharge devices are carried within housings 31. The combined heights of the housings 31 and secondary coils 26 should be sufficient to position the discharge elements 28 opposite the containers 24 and the surfaces thereof to be printed. Discharge elements are, therefore, positioned above the tops of the container mountings 23 at their uppermost positions on the frame 10.

Fig. 12 is a circuit diagram for a corona discharge producing device adequate to produce sufficient corona discharge to prepare polyethylene containers for printing. Filament transformer 32 serves to heat the filaments of the vacuum tubes 33 and 34 while plate transformer 35 is coupled with the two primary coils 30 and 30a and the vacuum tubes 33 and 34 to form a high frequency oscillator. The output of the secondary coil 26 is through the discharge elements or element 28 in the form of a corona discharge several inches in length. The passage of this corona discharge over substantially all of the surface of the container to be printed will adequately prepare it for printing.

As a specific example of the apparatus, filament transformer 32 has a 115 volt primary at 60 cycles and a 7.5 volt secondary at 8 amperes. The vacuum tubes 33 and 34 are Hytron 5514 transmitting tubes. Plate transformer 35 has a 115 volt 60 cycle primary and a 1200 volt at 315 milliamperes secondary. 36 is a zero to 350 milliamperes direct current test milliammeter. 37 is a .0008 microfarad 3000 volt mica transmitting capacitor. 38 is a .0016 microfarad 3000 volt capacitor which may be composed of .0007, .0004 and .0005 microfarad 3000 volt mica transmitting capacitors connected in parallel to get a total of .0016 microfarad. 39 is a .0005 microfarad 3000 volt mica transmitting capacitor. 40 is a 1250 ohm 25 watt adjustable resistor. Secondary coil 26 comprises 2400 turns of #29 heavy insulation magnet wire on a Bakelite or polystyrene tubing 1¾ inches in diameter and having a ⅛ inch wall. Upper primary coil 30a comprises 22 turns of #16 heavy insulation Formex wire and lower primary coil 30, 26 turns of #14 heavy insulation Formex wire. The primary and secondary coils should be wound in the same direction when mounted in position. Tube 42 is a 2¼ inch outer diameter Bakelite tube with a ⅛ inch wall to protect the secondary winding and help reduce radiation of the high frequency current to the surrounding air. All parts of any metal used should be covered with enamel, lacquer, shellac or varnish except where actual discharge is wanted. Nichrome wire is preferably employed as the discharge elements 29.

Means must be provided to properly position the container surfaces to be printed relative the corona discharge devices. It is of primary importance that the surface of the containers to be prepared for printing must pass sufficiently close to the ends of the discharge elements for the discharge therefrom to cover essentially all of the area to be printed. We have discovered that visual inspection of the play of the discharge on the container's walls will provide an adequate measure of the required surface exposure. The discharge itself appears in the form of a narrow luminous band of electrical "lightning" or light. When the discharge element or elements are sufficiently close to the container surface to properly treat it, the band of "lightning" or light from the discharge element will strike and spread over the surface of the container covering it with a "layer" of visible discharge as the container moves by the discharge elements. If the containers are not positioned close enough, the band or bands of light will not layer or spread over the surface and will merely retain the form of limited bands. Whether one or more discharge elements are employed, the surface to be printed must be "washed" completely by the corona discharge or the ink will not properly adhere thereto.

On the other hand, if the elements are positioned too close to the container surfaces, the direct impact of the discharge as it leaves the discharge element ends will streak the bottles and not give the discharge a chance to spread over the container surfaces to be printed. Thus the elements must be spaced far enough from the containers to avoid streaking and near enough for the discharge to completely "wash" the surface thereof. As an example, employing the specific apparatus disclosed above and utilizing a three prong discharge element array with each element spaced both horizontally and vertically from one another, when the ends of the discharge elements are ¹⁄₁₆ inch from the containers, the containers will be objectionably streaked. When the ends of the discharge elements are spaced from the containers a distance of from ⅛ inch to ⅜ inch, the "wash" of the corona discharge will be adequate to play or flare over the surface sufficiently to condition it properly for the printing. A ¼ inch distance has been discovered to be the optimum spacing in this specific example. At a spacing of ½ inch from the elements, the conveyor would have to be slowed down from the preferable operating speed of 80 inches per minute and more than one pass would have to be made of the containers in front of the discharge elements to properly treat them for printing. The total visible length of the discharges from the discharge elements in a three element or prong modification in the specific apparatus disclosed varies from 3 to 4 inches.

In view of the above critical spacing requirement, it is evident that for containers which are not round in vertical cross section and which have neck openings or orifices circular in cross section, means must be provided to fix the faces of the containers to be printed relative the discharge elements of the corona discharge devices. The need for such container positioning or fixing means is even more evident in view of the facts that the containers must be moved a considerable distance on a continuous conveyor which has a considerable amount of vibration, the containers being mounted thereon by inserting the orifices of the containers onto mounting pegs on the belt as shown in Fig. 3. In a mounting as shown in Fig. 3, the vibration of the conveyor tends to cause the containers to rotate around their vertical axes on the pegs unless they are so tightly fitted thereon that they will not fall off under the influence of gravity as desired at the end of the frame 10. If the containers rotate as described around their vertical axes, the containers themselves may actually contact the discharge elements and burn or streak or not be properly treated at some points of the surface thereof.

Preferably, the means for positioning the containers on the conveyor belts relative the discharge elements comprise apparatus contacting the containers during at least a portion of their travel on the conveyor means. One form of positioning means, shown in Figs. 1, 2 and 3, comprises guide rails 43 positioned along the side of the conveyor belt opposite the adjacent corona discharge device. Guide rails 43 are fixed to horizontal rods 44 which are carried in openings 45 through supports 46. Supports 46 are fixed by bolts 47 to conveyor base 10. Vertical threaded arms 48 are engageable with horizontal rods 44 to fix the latter relative supports 46. Adjustment of the horizontal rods 44 relative support 46 permits spacing of the rails 43 relative the discharge elements 29, depending on the thickness of the containers. The container receiving ends of rails 43 are outwardly angled as shown at 43a to deflect any out of line containers to their proper position longitudinally of the belt. Where a pair of discharge devices are employed spaced laterally from one another to avoid interference on opposite sides of the conveyor as in Figs. 1, 2 and 3, the outwardly angled container receiving end of the rail 43 opposite the downstream corona discharge device begins approximately opposite the end of the upstream corona discharge device rail 43 whereby no rotation of the containers occurs therebetween and both sides of the container will be properly treated for printing. Employing a pair of corona discharge devices as specifically disclosed above, a minimum 4 foot spacing is necessary to prevent interference therebetween without screening of the corona discharge devices. The nature of such interference is that the quantity of discharge from the discharge elements 29 of one of the discharge devices will be reduced.

Figs. 1 and 3 show a preferred form of mounting device 23 employable with the rail type positioning means above described. Mounting elements 23 preferably have base 23b substantially equal in diameter to the width of the conveyor belt. Base 23b is engaged by mounting screw 23a through belt 22 and has rounded container orifice engaging shaft 23c positioned above shoulder portion 23d of greater diameter than the inner diameter of the container orifice. The outer diameter of the orifice engaging shaft 23c is only slightly less than the inner diameter of the container orifice whereby the container will fit fairly snugly thereon but will fall by gravity therefrom as shown in Fig. 1. Container mounting 23 is preferably composed of dielectric material such as polystyrene, etc. Screw 23a may be of nondielectric material only if the spacing thereof from element 29 and/or the thickness of the dielectric material composing means 23 is sufficient to avoid drawdown of the corona discharge display from the elements 29.

Figure 10:
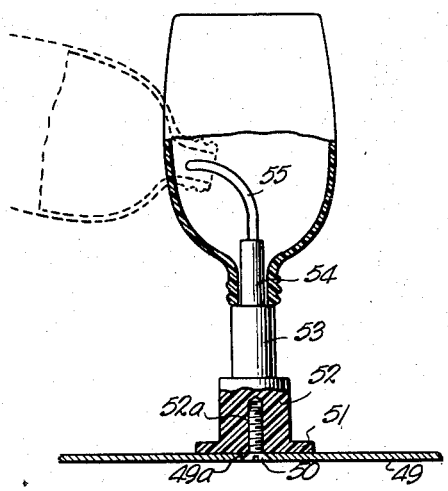
Fig. 10 is a side view of mounting means for polyethylene bottles to be used on a conveyor line as shown in Fig. 1, the dotted line construction showing the container before mounting and the full line construction showing the container after mounting on the mounting elements. Parts of this figure have been broken away to best illustrate the construction.
Figure 11:
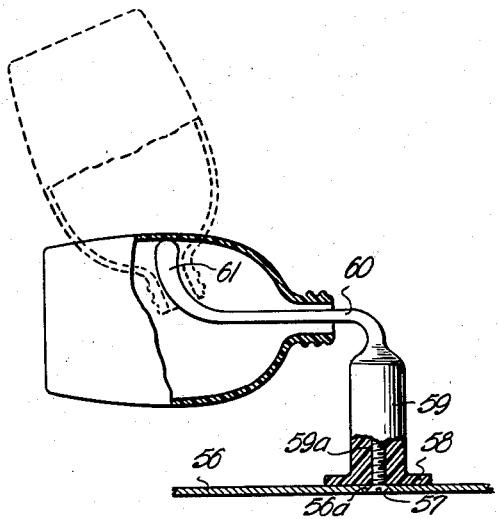
Fig. 11 is another form of mounting element to be employed on a conveyor line as shown in Fig. 1, the dotted line construction being the polyethylene container before mounting on the mounting element and the full line construction being the container after mounting.

Figs. 10 and 11 show other forms of mounting means employable without cooperating guide rails to properly position containers relative the discharge elements 29 for surface treatment thereof. Fig. 10 shows a conveyor belt 49 having mounting screw 50 extending through opening 49a therein. Base flange 51 of the mounting means is surmounted by base 52 carrying shoulder portion 53. Base 52 has threaded orifice 52a formed therein to receive screw 50. Container orifice penetrating shaft 54 has curved arm 55 thereon. Shaft 54 is of sufficient length to extend past the inner end of the container neck when the container is mounted thereon and has an outer diameter only slightly less than the inner diameter of the bottle orifice. Arm 55 extends along the length of the conveyor belt axially thereto, in either direction, as desired. The horizontal length of arm 55 is less than the distance from the center axis of the bottle to the inner side thereof.

Fig. 11 shows a conveyor belt 56 with mounting screw 57 extending through opening 56a therein. Base flange 58 of the mounting means has base 59 thereon with threaded orifice 59a therein to receive screw 57. Container mounting arm 60 extends along the length of the conveyor belt axially thereto and has essentially vertical arm 61 at the end thereof. Arm 61 preferably has a length less than the distance from the center axis of the bottle to the inner side thereof. Arm 61 may extend either upwardly or downwardly as desired. The container mounting means of Figs. 10 and 11 prevent rotation of a container nonround in vertical cross section around its center axis. The Fig. 10 modification is preferable where the bottles are of relative small height. The Fig. 11 modification is adapted to bottles of relatively great height.

Figs. 5 through 9 show preferred arrangements for multiple arm corona discharge element arrays. The breadth of the area treated by a single corona discharge element within the spacing limits relative the containers above described is extremely limited. Therefore, for the containers having relatively large surface areas to be prepared for printing, it is necessary to employ more than one corona discharge element at the discharge end of the secondary coils. Figs. 7–9 show the two element form of the corona discharge element array and Figs. 4–6 show the three element form. We have discovered that employing a corona discharge device as described above with corona take-off from one end of the secondary coil, when a plurality of discharge elements are employed to get a uniform discharge from the ends of each element, the ends of each of the elements must be spaced both vertically and horizontally from one another. Uniform discharge from each of the elements is required for uniform surface treatment of the containers. If the individual discharge elements are not both vertically and horizontally spaced one from the other, the interference therebetween will drain the discharge from one or other of the elements and nonuniform discharge both as to distance and quantity results.

In Figs. 7–9, conducting cap 62 extends out of insulator 63 and is connected to the upper end of a secondary coil (not shown). Upper and lower corona discharge elements 64 and 65 are fixed to the sides thereof and extend in a predetermined direction therefrom. The discharge ends of the elements 64 and 65 are spaced both vertically and horizontally one from another. The vertical spacing of the ends of the elements is critical additionally in that if they are not close enough together, the discharge "spray" on the container surface will not overlap or meet as is required for proper treatment. The horizontal spacing of the elements 64 and 65 must merely be sufficient to avoid interference therebetween. In Figs.

4-6 the three element corona discharge device is illustrated. From insulator 66, conducting cap 67 extends upwardly, the latter being connected to the upper end of a secondary coil (not shown). Discharge elements 68, 69 and 70 are connected to the sides and center of cap 67 and extend outwardly therefrom in a single predetermined direction. Each discharge element is spaced both vertically and horizontally from each other element. When more than two discharge elements are employed, and the bottle or container to be treated is mounted so that the surface to be printed has a vertical curvature relative the corona discharge elements (see Fig. 4), the center element should be of such length as to be spaced the same distance from the container surface immediately opposite it as the distance from the ends of the other discharge elements to the container surfaces immediately opposite them. As will be seen from Fig. 6, curvature of the container in other planes cannot be compensated for by the ends of the discharge elements. Thus a container should be mounted so the greatest curvature thereof is in the vertical plane so the corona discharge elements may be spaced uniformly relative the curvature thereof. The mounting means of Fig. 11 becomes important in certain such instances.

In operation of the modification of the invention shown in Figs. 1, 2 and 3, after the corona discharge devices have been turned on and are firing, the conveyor belt is started. The operator positioned near the power source 20 may then begin mounting bottles on the container mounting means 23. The guard rails 43 must have been adjusted relative the corona discharge elements 29 and the width of the containers so as to properly position the faces of the containers relative the discharge elements. As the containers are positioned on the mounting means 23 adjacent the power source end 20, they are moved forwardly and are faced by the guard rails 43 uniformly relative the conveyor belt. As the containers pass the first discharge device, the corona discharge bands spray against the adjacent face of the container, covering it and preparing the polyethylene surface for printing thereof. It has been discovered that a conveyor rate of 80 inches per minute will both permit convenient mounting of the containers by the operator on the conveyor belt and sufficient time for container surface treatment passing the discharge elements. After treatment at the first set of discharge elements, the containers move onwardly to the end of the first guard rail 43 and then are picked up by the second guard rail 43 opposite the downstream corona discharge device. The relative positions of the two guard rails prevent any rotation of the containers on the mounting means 23 so that both surfaces thereof will be treated for printing. As the containers pass the second corona discharge device, the opposite surface thereof is treated for printing. When the containers come to the end of the conveyor belt, they fall off the mounting means 23 by gravity as shown in Fig. 1, and fall into the receiving container 25. The dielectric construction of the conveyor means, the spacing of the discharge elements relative the polyethylene containers, and the dielectric construction of the mounting means 23, prevent any deflection or drawdown of the carona discharge away from the container surfaces to be treated. If the container positioning means as shown in Figs. 10 and 11 are employed to maintain the position of the containers relative the discharge devices, depending upon the size and shape of the containers, in some instances the containers may have to be removed from the mounting means by hand at the discharge end of the conveyor.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter hereinabove set forth or shown in the accompanying drawings is to be interpreted as illustrative and not in a limiting sense.

Having thus described our invention, we claim:

1. Apparatus for treating plastic containers in preparation for printing comprising continuous conveyor means, a plurality of container mountings spaced along a surface of said means and movable therewith, said mountings adapted to receive a plurality of plastic containers to be treated in preparation for printing thereon, means connected to said conveyor means to drive it at any predetermined velocity, a pair of devices for producing directional corona discharges into the atmosphere positioned on opposite sides of said conveyor means along the length thereof, at least one corona discharge element on each of said devices with the discharge ends thereof positioned at a level adjacent said container mountings and directed toward the conveyor, a source of electrical power for said corona discharge devices, and means contacting said containers during at least a portion of their travel on said continuous conveyor for fixing the position of the container surfaces to be printed relative the corona discharge elements.

2. Apparatus as in claim 1 wherein said corona discharge producing devices are spaced laterally one from another along the conveyor means.

3. Apparatus as in claim 2 wherein said means contacting said containers during at least a portion of their travel on the conveyor means for fixing the container surfaces to be printed relative the corona discharge elements comprise guide rails positioned adjacent each corona discharge device, the guide rail positioned adjacent each corona discharge device being positioned on the opposite side of the conveyor means therefrom.

4. Apparatus for treating plastic containers in preparation for printing comprising continuous conveyor means, a plurality of container mountings spaced along a surface of said conveyor means and movable therewith, said mountings adapted to receive a plurality of plastic containers to be treated in preparation for printing thereon, means connected to said conveyor to drive it at any desired predetermined velocity, a device for producing a directional corona discharge positioned on one side of the conveyor means along the length thereof, at least one corona discharge element on said device with the discharge end thereof positioned at a level adjacent said container mountings and directed toward the conveyor, a source of electrical power for said corona discharge device, and means contacting said containers during at least a portion of their travel on said conveyor means for fixing the position of the container surfaces to be printed relative the corona discharge element, said means contacting said containers for fixing the position of the container surfaces to be printed relative the corona discharge element comprising a guide rail positioned along at least one side of said conveyor means.

5. Apparatus as in claim 4 wherein said guide rail adjacent the corona discharge device is positioned on the opposite side of the conveyor means therefrom.

6. Apparatus for treating plastic containers in preparation for printing comprising continuous conveyor means having a substantially horizontal operating section of the conveyor, a plurality of container mountings spaced along the outer surface of said conveyor means and movable therewith, each said mounting adapted to receive and retain at least one plastic container to be treated in preparation for printing thereon during its passage through the horizontal operating section of the conveyor, means connected to said conveyor means to drive it at any desired velocity, a device for producing a directional corona discharge positioned on one side of said conveyor means along the length thereof, at least one corona discharge element on said device with the discharge end thereof positioned at a level adjacent said container mountings and directed toward the conveyor in a substantially horizontal plane and next the substantially horizontal operating section of the conveyor, a source of electrical power for said corona discharge device, and means contacting each said container during at least a portion of its travel on said conveyor means for fixing the position of the container surface to be printed relative the corona discharge element.

7. Apparatus as in claim 6 including a plurality of corona discharge elements on said device with the discharge ends thereof each positioned at a level adjacent said conveyor containing mountings and directed in a substantially horizontal plane in the direction of the conveyor means.

8. Apparatus as in claim 6 including a plurality of corona discharge elements on said device, said elements having the discharge ends thereof all positioned at a level adjacent said container mountings and directed in substantially horizontal planes toward the conveyor, said elements of such length relative the form of the containers to be treated as to be spaced essentially equidistant from the surface to be printed thereof.

9. Apparatus as in claim 6 including a plurality of corona discharge elements mounted on said device with the discharge ends thereof all positioned at a level adjacent said container mountings and directed toward the conveyor, the ends of said corona discharge elements displaced both horizontally and vertically, one from another.

References Cited in the file of this patent

UNITED STATES PATENTS

| | | |
|---|---|---|
| 1,352,699 | Smith | Sept. 14, 1920 |
| 1,960,174 | Smith | May 22, 1934 |
| 2,122,741 | Haddad | July 5, 1938 |
| 2,732,503 | Jacobs | Jan. 24, 1956 |

FOREIGN PATENTS

| | | |
|---|---|---|
| 510,068 | Belgium | Apr. 15, 1952 |